(12) United States Patent
Chen et al.

(10) Patent No.: US 7,438,825 B1
(45) Date of Patent: Oct. 21, 2008

(54) AZEOTROPE-LIKE COMPOSITION OF 1,1,1-TRIFLUORO-3-CHLOROPROPENE AND DIMETHOXYMETHANE

(75) Inventors: Benjamin Bin Chen, Wayne, PA (US); Philippe Bonnet, Lower Merion, PA (US)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 12/044,035

(22) Filed: Mar. 7, 2008

(51) Int. Cl.
C09K 5/04 (2006.01)
(52) U.S. Cl. .............................. 252/68; 252/67; 264/53
(58) Field of Classification Search .................. 252/67, 252/68; 264/53
See application file for complete search history.

(56) References Cited

U.S. PATENT DOCUMENTS

| | | | | |
|---|---|---|---|---|
| 5,710,352 A | * | 1/1998 | Tung ........................... | 570/166 |
| 7,094,356 B2 | * | 8/2006 | Minor et al. .................. | 252/68 |
| 2005/0285076 A1 | * | 12/2005 | Minor .......................... | 252/67 |
| 2005/0285078 A1 | * | 12/2005 | Minor .......................... | 252/67 |
| 2005/0285079 A1 | * | 12/2005 | Minor .......................... | 252/67 |
| 2008/0125505 A1 | * | 5/2008 | Bowman et al. ............. | 521/131 |

* cited by examiner

*Primary Examiner*—John R Hardee
(74) *Attorney, Agent, or Firm*—Steven D. Boyd

(57) ABSTRACT

Provided are azeotrope-like compositions comprising 1,1,1-trifluoro-3-chloropropene (HCFO-1233zd) and dimethoxymethane and uses thereof, including use in refrigerant compositions, refrigeration systems, blowing agent compositions, solvent, and aerosol propellants.

13 Claims, 1 Drawing Sheet ln P vs. 1000/T ns of 1,1,1-trifluoro-3-chloropropene (HCFO-1233zd) and
AZEOTROPE-LIKE COMPOSITION OF 1,1,1-TRIFLUORO-3-CHLOROPROPENE AND DIMETHOXYMETHANE

FIELD OF INVENTION

The present invention relates to azeotrope-like compositions of 1,1,1-trifluoro-3-chloropropene (HCFO-1233zd) and dimethoxymethane and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential. Additionally, the use of single component fluids or azeotropic mixtures, which do not fractionate on boiling and evaporation, is desirable. However, the identification of new, environmentally safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs.

The Montreal Protocol for the protection of the ozone layer, signed in October 1987, mandate the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. The emerging replacement materials, hydrofluoropropenes, were shown to be environmentally acceptable ie have zero ozone depletion potential (ODP) and acceptable low GWP.

Currently proposed replacement refrigerants for hydrofluorocarbons such as HFC-134a include HFC-152a, pure hydrocarbons such as butane or propane, or "natural" refrigerants such as $CO_2$. Many of these suggested replacements are, flammable, and/or have low energy efficiency. Therefore, new alternative refrigerants are being sought. Fluoroolefin materials such as hydrofluoropropenes and/or hydrochlorofluoropropenes have generated interest as replacements for HFCs.

The object of the present invention is to provide novel compositions that can serve as refrigerant and heat transfer fluids as well as blowing agents, solvent cleaners etc. that provide unique characteristics to meet the demands of low or zero ozone depletion potential and lower global warming potential as compared to the current HFCs.

DESCRIPTION OF PREFERRED EMBODIMENTS

Figure 1:
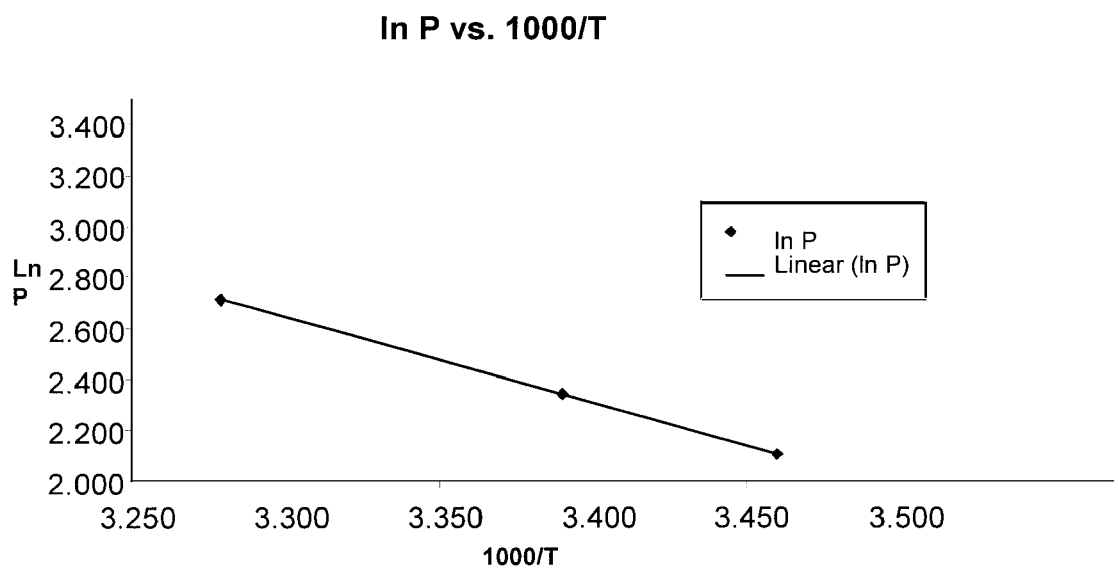
FIG. 1 is a plot of Log Pressure versus Temperature

The present inventors have developed several compositions that help to satisfy the continuing need for alternatives to CFCs and HCFCs. According to certain embodiments, the present invention provides azeotrope-like compositions comprising 1,1,1-trifluoro-3-chloropropene (HCFO-1233zd) and dimethoxymethane. The term HFCO-1233zd is used herein generically to refer to 1,1,1-trifluo-3-chloropropene, independent of whether it is the cis- or trans-form and therefore includes within its scope cis-HFCO-1233zd, trans-HFCO-1233zd, and all combinations and mixtures of these.

The preferred compositions of the invention tend both to be non-flammable and to exhibit relatively low global warming potentials ("GWPs"). Accordingly, applicants have recognized that such compositions can be used to great advantage in a number of applications, including as replacements for CFCs, HCFCs, and HFCs (such as HCFC123, HFC134a, HFC 245fa, HFC 365mfc etc.) in refrigerant, aerosol, and other applications.

Additionally, applicants have recognized surprisingly that azeotrope-like compositions of HCFO-1233zd and dimethoxymethane can be formed. Accordingly, in other embodiments, the present invention provides methods of producing an azeotrope-like composition comprising combining HCFO-1233zd and dimethoxymethane in amounts effective to produce an azeotrope-like composition.

In addition, applicants have recognized that the azeotrope-like compositions of the present invention exhibit properties that make them advantageous for use as, or in, refrigerant compositions and in foam blowing agents. Accordingly, in yet other embodiments, the present invention provides refrigerant compositions and/or blowing agents, and solvents comprising an azeotrope-like composition of HCFO-1233zd and dimethoxymethane.

Azeotrope-Like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant boiling and cannot be separated during a phase change.

The azeotrope-like compositions of the present invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well recognized in the art that it is not possible to predict the formation of azeotropes. Applicants have discovered unexpectedly that HCFO-1233zd and dimethoxymethane form azeotropes or azeotrope-like mixtures.

According to certain preferred embodiments, the azeotrope-like compositions of the present invention comprise, and preferably consist essentially of, effective azeotrope-like amounts of HCFO-1233zd and dimethoxymethane. The term "effective azeotrope-like amounts" as used herein refers to the amount of each component which upon combination with the other components, results in the formation of an azeotrope-like composition of the present invention. Preferably, the present azeotrope-like compositions comprise, and preferably consist essentially of, from about 20 to about 58 mole percent HCFO-1233zd, from about 42 to about 80 mole percent of dimethoxymethane. Unless otherwise indicated, the mole percents disclosed herein are based on the total moles of HCFO-1233zd and dimethoxymethane in a composition.

The azeotrope-like compositions described herein preferably have a boiling point of from about 29.98° C. to about 35.81° C. at a pressure of about 14.7 psia.

The azeotrope-like compositions of the present invention can be produced by combining effective azeotrope-like amounts of HCFO-1233zd and dimethoxymethane. Any of a wide variety of methods known in the art for combining two or more components to form a composition can be adapted for use in the present methods to produce an azeotrope-like composition. For example, HCFO-1233zd and dimethoxymethane can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Composition Additives

The azeotrope-like compositions of the present invention may further include any of a variety of optional additives including stabilizers, metal passivators, corrosion inhibitors, and the like.

In certain preferred embodiments, the compositions of the present invention further comprise a lubricant. Any of a variety of conventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used. Examples of suitable lubricants include mineral oil, alkyl benzenes, polyol esters, including polyalkylene glycols, PAG oil, and the like. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate which is available as Emery 2917 (registered trademark) and Hatcol 2370 (registered trademark). Other useful esters include phosphate esters, dibasic acid esters, and fluoroesters. Preferred lubricants include polyalkylene glycols and esters. Certain more preferred lubricants include polyalkylene glycols.

Uses of the Compositions

The present compositions have utility in a wide range of applications. For example, one embodiment of the present invention relates to refrigerant compositions comprising the present azeotrope-like compositions.

The refrigerant compositions of the present invention may be used in any of a wide variety of refrigeration systems including air-conditioning, refrigeration, heat-pump, chiller, HVAC systems, and the like. In certain preferred embodiments, the compositions of the present invention are used in refrigeration systems originally designed for use with an HCFC refrigerant, such as, for example, HCFC123. The preferred compositions of the present invention tend to exhibit many of the desirable characteristics of HCFC123 and other HFC refrigerants, including a GWP that is as low, or lower than that of conventional HFC refrigerants and a capacity that is as high or higher than such refrigerants. In addition, the relatively constant boiling nature of the compositions of the present invention makes them even more desirable than certain conventional HFCs for use as refrigerants in many applications.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, silicone oils, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter evaporating said refrigerant composition. In light of the disclosure herein, those of skill in the art will be readily able to heat and cool articles according to the present inventions without undue experimentation.

In another embodiment, the azeotrope-like compositions of this invention may be used as propellants in sprayable compositions, either alone or in combination with known propellants. The propellant composition comprises, more preferably consists essentially of, and, even more preferably, consists of the azeotrope-like compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleansers, and polishing agents as well as medicinal materials such as anti-asthma and anti-halitosis medications.

Yet another embodiment of the present invention relates to a blowing agent comprising one or more azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. Any of the methods well known in the art, may be used or adapted for use in accordance with the foam embodiments of the present invention.

Another embodiment of this invention relates to a process for preparing a foamed thermoplastic product is as follows: Prepare a foamable polymer composition by blending together components comprising foamable polymer composition in any order. Typically, a foamable polymer composition is prepared by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin to or near to its glass transition temperature (Tg), or melt temperature (Tm) for crystalline polymers.

Other uses of the present azeotrope-like compositions include use as solvents, cleaning agents, and the like. Examples include vapor degreasing, precision cleaning, electronics cleaning, drying cleaning, solvent etching cleaning, carrier solvents for depositing lubricants and release agents, and other solvent or surface treatment. Those of skill in the art will be readily able to adapt the present compositions for use in such applications without undue experimentation.

EXAMPLES

The invention is further illustrated in the following examples which are intended to be illustrative, but not limiting in any manner.

Example 1

A high-pressure cell equipped with a certified pressure gauge was evacuated by a vacuum pump to remove all permanent gases. 10 g of methyl formate was then loaded into the cell by a stainless steel syringe pump. The metal bomb was placed in an orbital shaker in which temperature was controlled at the accuracy of 0.1° C. Pressure was measured at 16, 22, and 32° C. At each temperature the pressure was measured after minimum one hour in order to achieve equilibrium. The accuracy of the pressure gauge was + or −0.1 psia. In order to confirm permanent gases were not interfering with the pressure measurement, ln P was plotted against 1000/T. A good linear fit was achieved with $R^2$=0.9999, indicating no permanent gases were involved.

Boiling point can be calculated used the following equation assuming the ambient pressure is 14.7 psia, $Ln\ P = a + b/T$ From the plot of ln P against 1000/T, FIG. 1, the boiling point of methyl formate was calculated as 31° C. which is consistent with the literature.

Example 1 validates the integrity of the equipment used.

Example 2

Figure 2:
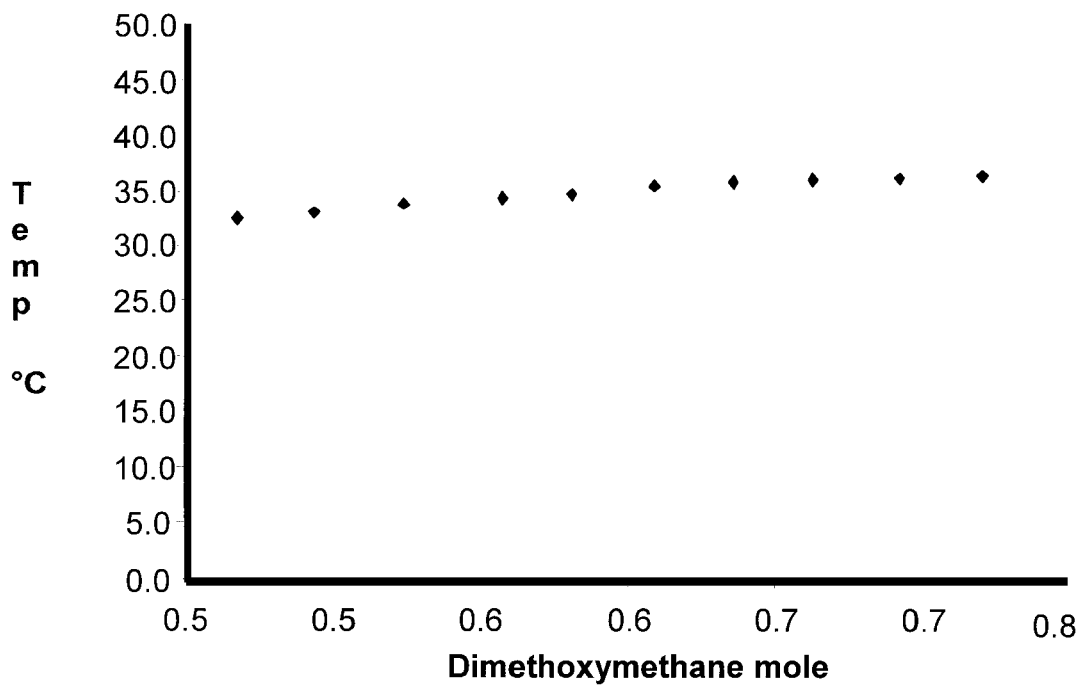
FIG. 2 is a plot of Boiling Point verses Dimethoxymethane Mole Fraction

10.2 g of 1233zd then loaded into high-pressure cell by a stainless steel syringe pump. Dimethoxymethane was added in an increment of between 0.3 to 3 grams. Once addition of dimethoxymethane was completed, the pressure cell was carefully weighted; all lines are carefully vacuumed so that permanent gases and residual dimethoxymethane would not contribute to PTx (pressure) measurements. The vapor pressure was measured at 16, 29, and 42° C., and boiling point was calculated using Equation 1 by assuming the atmospheric pressure of 14.7 psia. The results are shown in FIG. 2 and Table 1.

TABLE 1

| Mole Fraction | | |
|---|---|---|
| 1233zd | Dimethoxymethane | Boiling Point ° C. |
| 0.58 | 0.42 | 29.98 |
| 0.55 | 0.45 | 30.87 |
| 0.52 | 0.48 | 31.59 |
| 0.48 | 0.52 | 32.40 |
| 0.46 | 0.54 | 33.03 |
| 0.43 | 0.57 | 33.74 |
| 0.39 | 0.61 | 34.25 |
| 0.37 | 0.63 | 34.67 |
| 0.34 | 0.66 | 35.24 |
| 0.31 | 0.69 | 35.67 |
| 0.29 | 0.71 | 35.88 |
| 0.26 | 0.74 | 36.07 |
| 0.23 | 0.77 | 36.18 |
| 0.20 | 0.80 | 35.81 |

The data in Table 1 shows the azeotrope like properties of the combination of the present invention.

The isothermal pressure plots of FIG. 2 evidences the azeotrope like properties of the combination of the present invention.

What is claimed is:

1. An azeotrope-like composition comprising effective amounts of 1,1,1-trifluoro-3-chloropropene and dimethoxymethane.

2. The azeotrope-like composition of claim 1 which consists essentially of from about 20 to about 58 mole percent 1,1,1-trifluoro-3-chloropropene, and from about 42 to about 80 mole percent of dimethoxymethane.

3. The azeotrope-like composition of claim 1 having a boiling point of from about 29.98° C. to about 35.81° C. at a pressure of about 14.7 psia.

4. The composition of claim 1 further comprising a lubricant.

5. The composition of claim 4 wherein said lubricant is selected from the group consisting of mineral oil, alkyl benzenes, polyol esters, polyalkylene glycols, and combinations of two or more thereof.

6. A refrigerant composition comprising an azeotrope-like composition of claim 1.

7. A refrigeration system comprising a refrigerant of claim 6.

8. A method for cooling an article which comprises condensing a refrigerant composition of claim 6 and thereafter evaporating said refrigerant composition in the vicinity of the article to be cooled.

9. A method for heating an article which comprises condensing a refrigerant composition of claim 6 in the vicinity of the article to be heated and thereafter evaporating said refrigerant composition.

10. A sprayable composition comprising a material to be sprayed and a propellant comprising an azeotrope-like composition of claim 1.

11. A sprayable composition according to claim 10 wherein the sprayable composition is an aerosol.

12. A blowing agent comprising an azeotrope-like composition of claim 1.

13. A solvent comprising an azeotrope-like composition of claim 1.

* * * * *